(12) United States Patent
Alvin et al.

(10) Patent No.: US 6,361,575 B1
(45) Date of Patent: Mar. 26, 2002

(54) MULTIPURPOSE SINGLE EXTERNAL SEAL FILTER ASSEMBLY FOR METALLIC AND CERAMIC TUBE FILTERS WITH INTEGRAL LOCKING MEANS

(75) Inventors: Mary Anne Alvin, Pittsburgh; Gerald J. Bruck, Murrysville; Eugene E. Smeltzer, Export, all of PA (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 0 days.

(21) Appl. No.: 09/602,214

(22) Filed: Jun. 23, 2000

(51) Int. Cl.[7] .......................... B01D 39/20; B01D 29/13
(52) U.S. Cl. ....................... 55/378; 55/482; 55/502; 55/508; 55/523
(58) Field of Search ............................... 55/341.1, 378, 55/482, 484, 486, 502, 508, 523

(56) References Cited

U.S. PATENT DOCUMENTS

| | | |
|---|---|---|
| 5,185,019 A | 2/1993 | Haldipur et al. |
| 5,433,771 A | 7/1995 | Bachovchin et al. |
| 5,474,586 A | 12/1995 | Eaton et al. |
| 5,876,471 A | 3/1999 | Lippert et al. |

Primary Examiner—Robert A. Hopkins (57) ABSTRACT

A filter assembly (60) for holding a filter element (28) within a hot gas cleanup system pressure vessel is provided, containing: a filter housing (62), said filter housing inner walls defining a joint (98), said walls defining an interior volume (67); a one piece, fail-safe/regenerator device (68) within the interior chamber (67) of the filter housing (62) having outer walls defining a joint (98') which mates with the filter assembly joint (98), containing outward-extending radial flanges (99 and 99') with mating holes (100 and 100') through both the housing (62) and fail-safe/regenerator device (68) for seating an essential sealing means (70) between the joints (98 and 98').

12 Claims, 5 Drawing Sheets

MULTIPURPOSE SINGLE EXTERNAL SEAL FILTER ASSEMBLY FOR METALLIC AND CERAMIC TUBE FILTERS WITH INTEGRAL LOCKING MEANS

BACKGROUND OF THE INVENTION

1. Field of the Invention

This invention relates generally to hot-gas cleanup systems and more particularly to a filter assembly that includes an all metal fail-safe/regenerator device, a metal filter housing and either a metallic or ceramic type filter element that has an integral locking means, requires only a single primary external particulate barrier seal, and allows ease of attachment of the fail-safe/regenerator device to the filter housing. Ceramic type filter elements may also have one or more secondary gasket type seals.

2. Background Information

Modern industrial methods have resulted in a need for an apparatus that is capable of efficiently filtering high temperature combustion gases containing particulate material. In combustion turbine applications, for example, a combustion turbine uses energy generated from hot pressurized combustion gases produced by burning natural or propane gas, petroleum distillates or low ash fuel oil. When coal and other solid fuels are burned, particulates carried over from the combustion of such solid fuels can cause turbine blade erosion and fouling. An efficient system for filtering of such hot combustion gases would permit the use of such solid fuels. As another example, in conventional boiler operations, the boilers undergo routine shutdown for cleaning the fireside surfaces and for inspection. An efficient hot gas filtering system would greatly extend the life and operational time for a boiler to operate between inspections. Fouling of the fireside surface due to ash deposition and corrosion would be eliminated or minimized.

Also, as a key component in advanced coal-or biomass-based power applications, hot gas filtration systems protect the downstream heat exchanger and gas turbine components from particle fouling and erosion, cleaning the process gas to meet emission requirements. When installed in either pressurized fluidized-bed combustion plants, pressurized circulating fluidized-bed combustion plants, or integrated gasification combined cycle plants, lower downstream component costs are projected, in addition to improved energy efficiency, lower maintenance, and elimination of additional expensive fuel or flue gas treatment systems. As a critical component, long-term performance, durability, and life of the filter elements and associated high temperature gasket seals are essential to the successful operation of hot gas filtration systems in advanced combustion and gasification applications.

U.S. Pat. Nos. 5,185,019 and 5,433,771 (Haldipur et al. and Bachovchin et al., respectively) disclose a thick walled hot gas candle filter mounting assembly with no seal that is external to the side of the fail-safe/regenerator type device shown, and with separate locking means. However, Haldipur et al. teaches a side pin thread arrangement and Bachovchin utilizes a bottom-retaining ring 72. U.S. Pat. No. 5,474,586 (Eaton et al.) discloses a thin walled hot gas candle filter mounting assembly, and discusses gasket assemblies generally. It too has no external side seal between a fail-safe means and the filter housing, here 12, and also has a separate locking means, annular flange 74. U.S. Pat. No. 5,876,471 (Lippert et al.), provides a filtering apparatus that can filter aggressive, high temperature, high-pressure gases, having an improved, double gasket assembly that can be employed with a conventional ceramic candle filter or a thin walled ceramic composite filter. It has no side seal between a fail-safe means, here 68, and the filter housing. It also has a separate locking means 78. This system uses a complicated series of sleeving and gaskets.

Additionally, U.S. Ser. No. 09/263,436, filed on Mar. 4, 1999, now U.S. Pat. 6,123,746 provided an improved gasketing assembly, with an optional fail-safe/regenerator, and described possible use of metallic filter elements having the same connection and configuration as standard ceramic candle filters. There, no side seals between a fail-safe means 68 and the filter housing were shown, and a separate locking means 78 was used.

U.S. Ser. No. 09/393,561, filed on Sep. 10, 1999, now U.S. Pat. 6,273,925 describes an all-metal fail-safe/regenerator filter device which fits within a filter housing 62 and has two seals 70 and 73 external to the fail-safe/regenerator 67 and between the filter housing and the fail-safe/regenerator device, as well as a separate locking means 78 which comprises a two flat portions, one portion being of the filter housing 62 and the other being of the locking means, with a threaded hole perpendicular to the threaded surfaces, and with a bolt threadably engaging the threaded holes. This device also requires an outwardly extending radial flange 71. This flange is defined as being machined at right angles to the device wall 69 or square at the top and beveled at the bottom.

All of these various designs have a variety of advantages, but most require a large number of seals and locking means, adding to complexity, cost and difficulty of substitution.

As a result, there is a need to develop use of better and simpler connections within the filter assembly for advanced coal-fired and other higher temperature operation applications, that would be resistant to combinations of sulfur and steam contact at high temperatures, and which would be able to substitute easily into existing systems in the field with a minimum of part substitution. It would also be desirable to have a minimum number of seals reducing the number of degradable components and increasing reliability.

SUMMARY OF THE INVENTION

Therefore, it is a main object of this invention to provide an improved filter assembly and fail-safe/regenerator device having strengthened, simpler connections that are resistant to steam, sulfur, alkali, chlorides, and other contaminants found in steam laden coal gas.

It is a further object to provide a simplified design that can easily substitute into existing units.

These and other objects are accomplished by providing a filter assembly for holding a filter element within a hot gas cleanup system pressure vessel, said filter assembly comprising:

(a) a tubular filter housing, said filter housing having a parallel top inner wall and bottom inner wall, where the top wall has a smaller inner diameter and where a joint is formed where the walls join, where the bottom wall ends in an integral outward-extending flange with holes therethrough, said walls defining an interior chamber;

(b) a one piece, all metal, tubular fail-safe/regenerator device, having a parallel top wall and bottom outer wall, where the top wall has a smaller outer diameter and where a joint is formed where the walls join, said walls and joint mating with the inner walls and the joint of the filter housing, and where the bottom wall contains an integral outward-extending flange with holes therethrough which mate with the holes in the filter housing flange;

(c) one essential sealing means consisting of one compliant gasket separate and apart from the filter housing and fail-safe/regenerator device, said compliant gasket positioned between mating joints of the filter housing and fail-safe/regenerator device, said gasket effective to provide a seal between the filter housing and the fail-safe/regenerator device; and (d) a porous filter element body attached at the bottom of the metal fail-safe/regenerator device. The fail-safe/regenerator device can have a long extension which can be welded to a filter element body, when the filter element is made of metal.

The invention also resides in a filter assembly for holding a filter element within a hot gas cleanup system pressure vessel, the filter element including a porous body having two opposing ends, one defining an attachable open end and the other defining a closed end; the filter element body having a uniform inside diameter, said filter assembly for holding a filter element comprising:

(a) a tubular filter housing, said filter housing having a top end, a bottom end, and a certain axial length and having peripheral inner sidewalls composed of a uniform inner diameter top surface and a larger uniform inner diameter bottom surface defining a first top portion and a second bottom portion, with an inner joint formed where the two portions converge, and where the bottom end has a flat surface perpendicular to the larger uniform inner diameter surface of the bottom portion, said bottom flat surface having at least one hole therethrough, perpendicular to said bottom flat surface, said sidewalls defining an interior chamber;

(b) a one piece, all metal, tubular fail-safe/regenerator device, having a top portion and a second bottom portion, disposed within the interior chamber of the filter housing, where the top portion has a parallel top outside wall and the bottom portion has a parallel bottom outside wall with an outside diameter larger than the top outside wall, where a joint is formed where the two portions converge, where the outside surfaces of the fail-safe/regenerator device mate with the inside surfaces of the filter housing, the outer surfaces of the fail-safe/regenerator device having a joint opposite the inner joint of the filter housing, and where the bottom end has a flat outside surface mating to the bottom end flat surface of the filter housing, said bottom flat outside surface having at least one hole therethrough opposite the at least one hole through the bottom flat surface of the filter housing, the device also having heat transfer media disposed between a screening means at the top of the device within the filter housing and a screening means at the bottom of the device for particle capture;

(c) one essential sealing means consisting of one compliant gasket separate and apart from the filter housing and fail-safe/regenerator device, said compliant gasket positioned between the joints of the filter housing and the fail-safe/regenerator device, said gasket effective to provide a complete seal between the filter housing and the fail-safe/regenerator device;

(d) a porous filter element body attached to the bottom of the metal fail-safe/regenerator device outside of the filter housing; and (e) means to attach the filter housing and fail-safe/regenerator device through the opposing holes in each bottom flat surface.

The invention also resides in a metal fail-safe/regenerator device with a metallic-type filter element attached by welding. A modified bottom end of the fail-safe/regenerator device and a metal adapter ring may be used to mate and form an attachment between a porous ceramic filter element and the fail-safe/regenerator device.

Such a design utilizes a very strong essentially all metal type design which can be used with a metal type porous filter element made of a superalloy which is corrosion resistant in porous form in the presence of steam, alkalis, chlorides, or with standard, thick-walled ceramic type porous filter elements. This design allows quick and easy repairs in the field, being compatible with most prior art units.

The design disclosed herein also integrates the fail-safe/regenerator, holder mount, and porous metal, intermetallic or metallic/ceramic composite media into an integral, single unit. Said unit utilizes a single, compression fit, compliant gas seal when retrofitably installed into particulate filtration systems in advanced coal-based power systems and/or biomass and industrial applications. An integral fail-safe/regenerator-holder mount concept is similarly disclosed for use with ceramic monolithic, filament wound or composite filter elements, in conjunction with standard compliant gas sealing and mounting assemblies.

BRIEF DESCRIPTION OF THE DRAWINGS

For a better understanding of the invention, reference may be made to the exemplary embodiments shown in the accompanying drawings, which.

DESCRIPTION OF THE PREFERRED EMBODIMENTS

Figure 1:
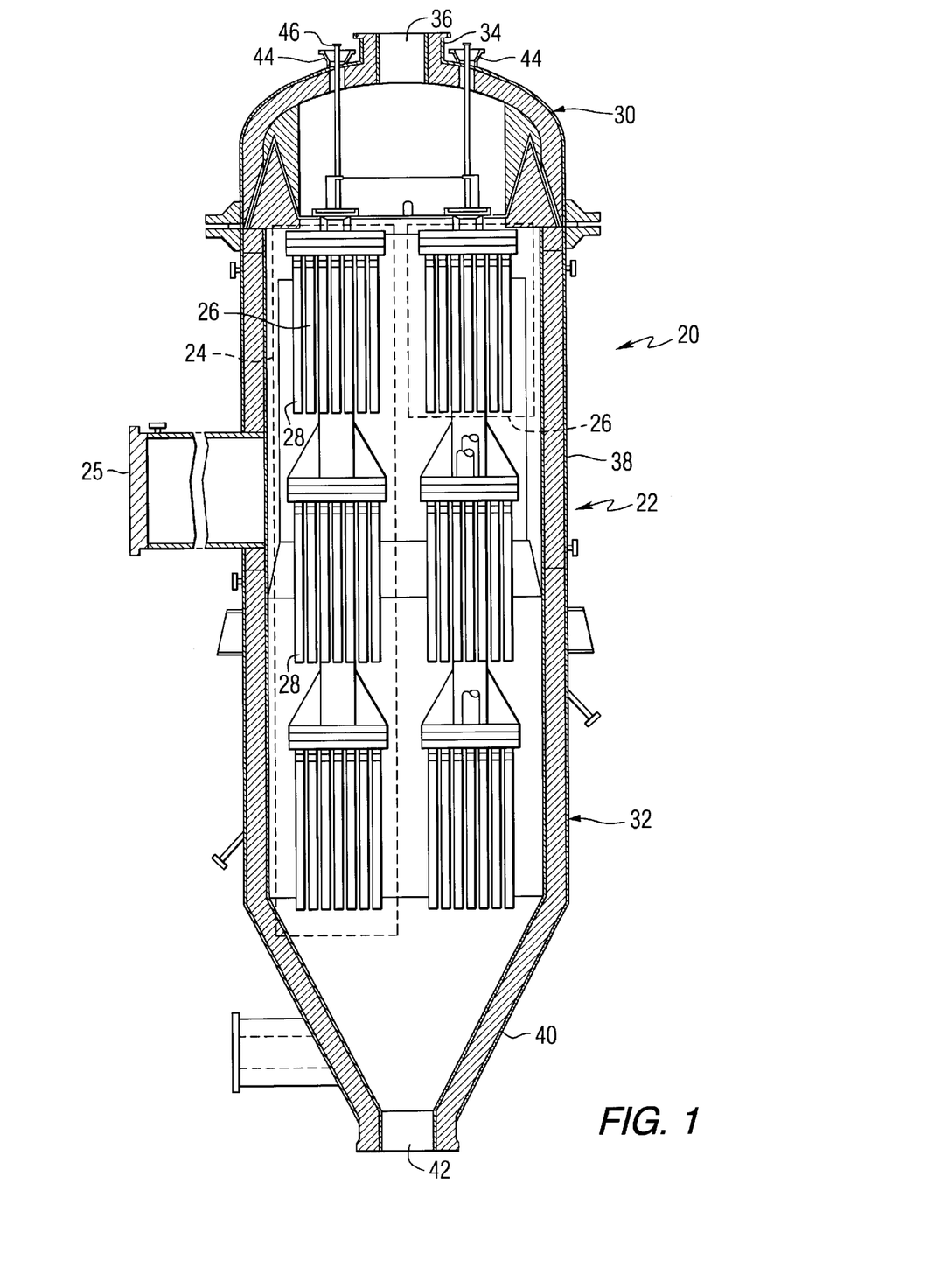
FIG. 1 is a longitudinal section view of a pressure vessel incorporating a filter assembly in accordance with the present invention.

FIG. 1 shows a filtering apparatus 20 for separating particulate matter from a gas stream. This apparatus includes a pressure vessel 22 in which there are mounted a plurality of clusters 24 comprising a plurality of filter element arrays 26. These filter element arrays 26 include a plurality of metallic filter elements 28.

The pressure vessel 22 has a dome-shaped head 30 and a body 32. The dome-shaped head 30 terminates in a linear tip 34, defining an exit opening or nozzle 36 for the filtered gas to be removed from the vessel 22. While the exit is shown at the top, it may also be at the side of the head 30 for ease of attachment of auxiliary components. The body 32 includes a dirty gas inlet 25, where gas containing particulates enters at a temperature of from about 1110° F. (600° C.) to about 1830° F. (1000° C.) and also usually contains about 2 vol. % to 25 vol. % water vapor in the form of steam, 200 ppmv to 0.5 vol. % sulfur in the form of $SO_3$, $SO_2$, $H_2S$ and other components such as C, chloride, alkali and the like which attack/oxidize most metals. The body also contains an upper part 38 having a generally circular cylindrical shape joined by a frustoconical ash hopper 40 for receiving the particulate matter terminating in a linear tip defining an opening or nozzle 42 connected to an ash discharge line. A plurality of ports 44 extends from the dome-shaped head 30. The ports 44 provide a site for inserting instrumentation and for viewing the interior of the dome-shaped head 30 during shut-down periods. Through each port, tubes 46 for supplying a back pulse burst of gas for cleaning the filters 28 can be placed.

Figure 2:
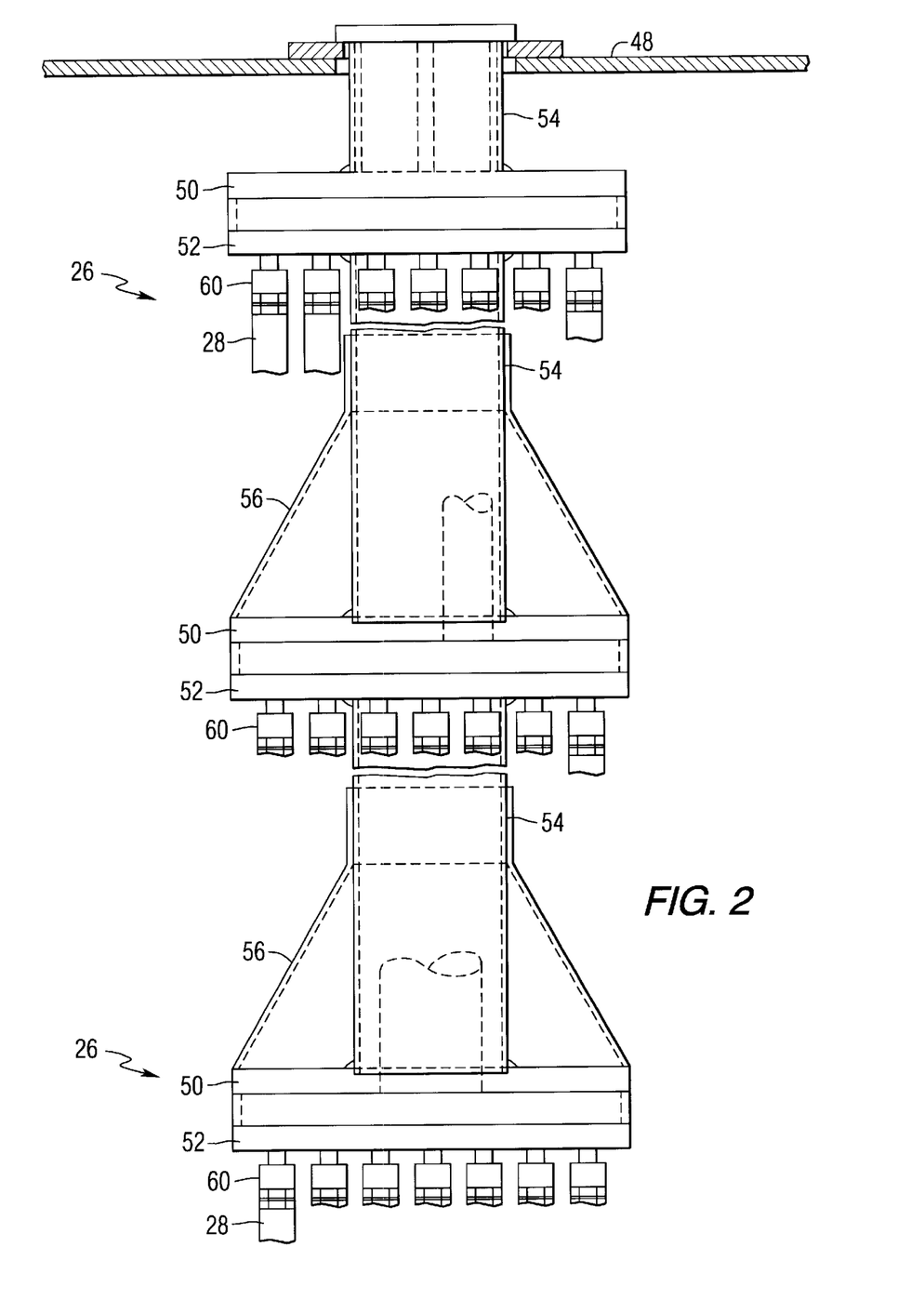
FIG. 2 is a side elevation view of an array of filter assemblies, including filter elements, coupled to a tube sheet as shown in FIG. 1.

Referring to FIG. 2, the pressure vessel includes a tube sheet 48. The tube sheet 48 supports the plurality of filter element arrays 26. Each filter element array 26 comprises a manifold plenum consisting of an upper plate 50 and a lower plate 52 and side plate. In accordance with the present invention, each filter element 28 is held by a filter assembly 60 and coupled to the corresponding lower plate 52 of the manifold plenum. The filter assemblies 60 are integrated into a structural unit by plenum support pipes 54. Each plenum support pipe 54 is secured centrally within the pressure vessel 22. A dust shed or particle-deflector 56 having a generally frustoconical shape is also shown.

Figure 3:
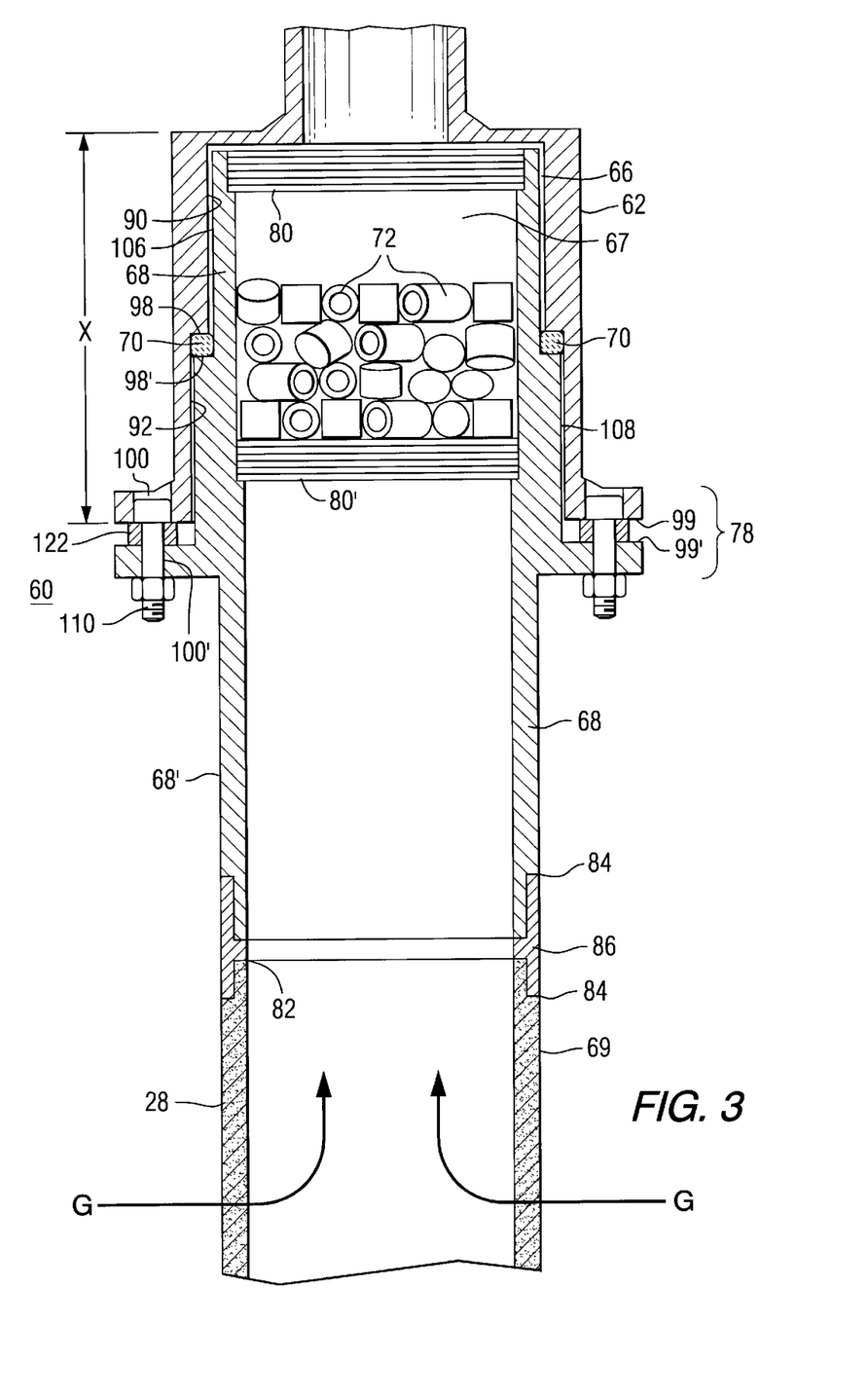
FIG. 3 is a sectional view of a filter assembly, including a one piece, all metal fail-safe/regenerator device, and having only one essential seal in accordance with the present invention, employed with a weld-connected, porous metallic hollow filter.

One embodiment of the preferred filter assembly 60 of the present invention for use with a metallic, superalloy type and/or intermetallic, hollow, porous tube filter element 28 will now be described. Referring to FIG. 3, the filter assembly 60 provides a particulate barrier filtering means between the clean gas passing through the filter and dirty gas surfaces of the filter. In FIG. 3, the filter assembly 60 is shown assembled. The filter assembly 60 comprises a filter housing 62 having a certain axial length X, and peripheral sidewalls 90 and 92 which define an interior filter housing chamber generally shown as 66, a top, one piece, all metal, fail-safe/regenerator device 68, having outer sidewalls 106 and 108, and top interior volume 67, installed within the interior chamber 66 of the filter housing 62. The length X, can be smaller (that is, extending to just below the one essential sealing means 70) or larger (that is, extending closer to the flange 99'). Thus, flat surfaces 99 and 99' may be above or below the length X.

Figure 5:
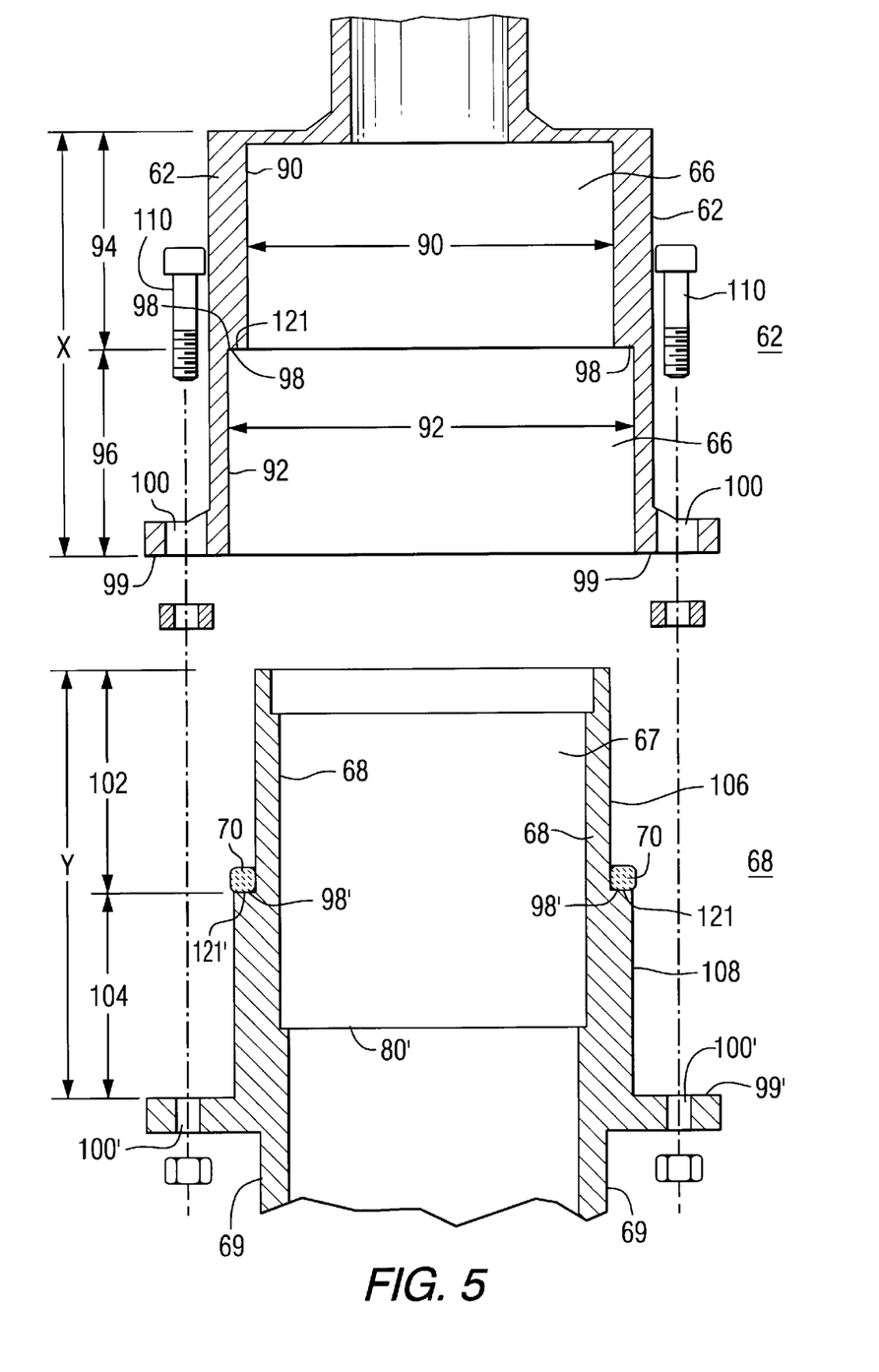
FIG. 5, which best shows the invention, is an expanded view of the devices of FIGS. 3 and 4, showing their common elements.

As shown in the expanded view of FIG. 5, the filter housing 62 has a top, a bottom and an axial length, as well as peripheral inner sidewalls composed of a uniform inner diameter top surface wall 90 and a larger uniform inner diameter bottom surface wall 92. These surfaces define a first top portion 94 and a second bottom portion 96, with an inner joint 98 formed where the two portions 94 and 96 converge and where walls 90 and 92 join. The bottom end 96 has a flat surface 99 perpendicular to the inner diameter wall surface 92 of the bottom portion, said bottom flat surface 99 having at least one hole 100 therethrough, perpendicular to said bottom flat surface 99, where the peripheral inner sidewalls 90 and 92 define an interior filter housing chamber 66 into which the fail-safe/regenerator with its own chamber 67 fits.

A mating, one-piece, all-metal fail-safe/regenerator device 68 has a top portion 102 and a second bottom portion 104, together defining a certain axial length Y, with outside top and bottom surfaces 106 and 108 capable of being disposed within the interior chamber 66 of the filter housing 62. The top portion 102 has a parallel top outside wall 106 and the bottom portion 104 has a parallel bottom outside wall 108 with an outside diameter larger than the top outside wall 106 where a joint 98' is formed where the two portions converge.

The outside wall surfaces 106 and 108 of the fail-safe/regenerator device 68 mate with the inside surfaces 90 and 92, respectively, of the filter housing 62. By "mate" or "mating" is meant that outer wall surface 106 is closely adjacent to top inner wall surface 90 and outer wall surface 108 is closely adjacent to bottom inner wall surface 92 when fail-safe/regenerator device 68 is inserted into housing 62. The fail-safe/regenerator device 68 has a joint 98' opposite the inner joint 98 of the filter housing 62 where outer walls 106 and 108 join, where the fail-safe/regenerator device 68 has an integral flat outside surface flange 99' mating to an integral bottom end flat surface flange 99 of the filter housing 62, the bottom flat surface flange 99' having at least one hole 100' therethrough, opposite the hole 100 through the bottom flat surface flange 99 of the bottom filter housing 62.

Referring again to FIGS. 3 and 4, the fail-safe/regenerator device 68 also will generally have heat transfer media (such as that shown as 72) disposed between a screening means 80 at the top of the device, within the filter housing, and screening means 80' at the bottom of the device. These heat transfer media can have a variety of configurations. The one essential sealing means 70, consisting of one compliant gasket separate and apart from the filter housing 62 and fail-safe/regenerator device 68, is positioned between the joints 98 and 98' of the filter housing and the fail-safe/regenerator device, respectively (as shown in FIG. 5), said gasket 70 being effective to provide a complete seal between the filter housing 62 and the fail-safe/regenerator device 68.

Figure 4:
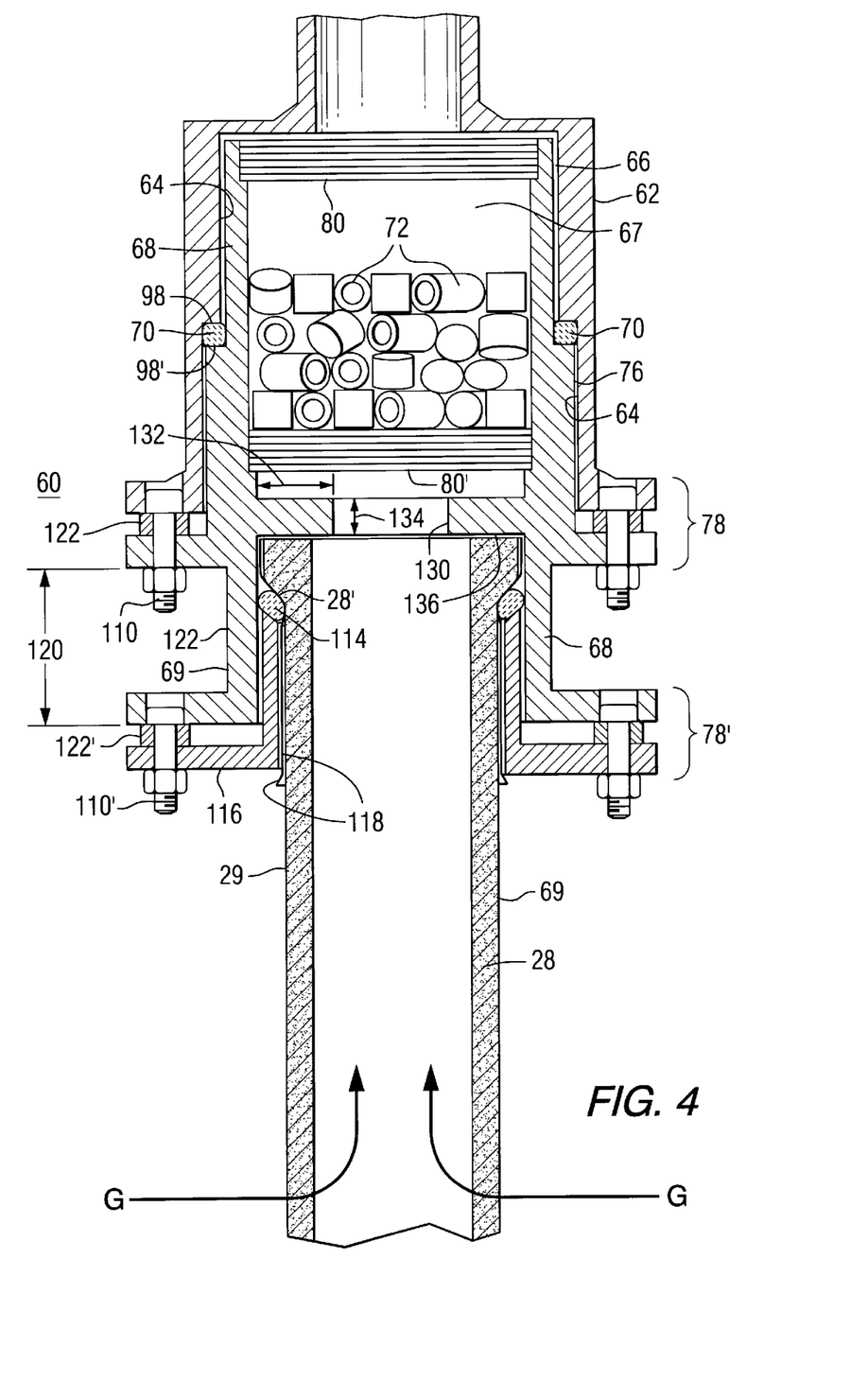
FIG. 4, which shows an alternate embodiment of the invention, is a sectional view of a filter assembly similar in many respects to that of FIG. 3, but having an extra attachment means for a porous ceramic hollow filter.

A porous filter element body 28 is attached to the bottom of the metal fail-safe/regenerator device 68 outside of the filter housing, by a variety of means depending upon the construction of the filter body 28. A locking means 78 attaches the filter housing and fail-safe regenerator device through the opposing holes 100 and 100' in each bottom flat surface integral flange 99 and 99', respectively. The use of the integral flanges, that is, not a separate "floating" piece usually shown in the prior art as a cast nut to provide a couple, helps eliminate many of the required prior art seals. The locking means can comprise the two parallel surfaces 99 and 99', with at least one threaded hole 100 and 100' therethrough perpendicular to the flat surfaces, where at least one bolt 110 engages the at least one threaded hole.

The fail-safe/regenerator device provides an interior volume 67 for round, oval, square, needle-like fibers, etc. solid or hollow metal heat transfer media 72, shown in FIGS. 3 and 4. These heat transfer media are shown only at the bottom of the fail-safe/regenerator device for simplicity but can fill the entire volume 67 of the fail-safe/regenerator device 68 between two screen sets, 80 at the top of the device and 80' at the bottom of the device. Set 80 can consist of perforated plates and coarse screen and fine wire mesh or screen. These screens can be made from a corrosion resistant alloy such as stainless steel, Alloy HR230, and the like. The heat transfer media are usually short hollow Rashig ring tubes, shown as 72 in FIGS. 3 and 4. Usually, two layers of screens plus a perforated plate enclose the heat transfer media 72, and also in the event of filter failure, trap particulate matter between them and prevent collected particulate matter from being liberated into the clean gas stream during normal process operation, or back pulsed into filter elements 28 and/or the interior of the filter vessel during pulses of reverse flow cleaning gas.

Extending below the filter housing, the fail-safe/regenerator device 68 typically is attached to a metal or ceramic tube. As can be seen, the weldable metal filter element 28, shown in FIG. 3, allows ease of attachment to the fail-safe/regenerator device 68 at a weldable open end at the bottom point 82 or through a metal adapter ring structure 86 having, for example, connections at 84. As shown, the device 68 can have a long extension 68' when attachment is to a metal filter element. The only other connection of the integral fail-safe/regenerator metal filter element is through simple locking means 78, and the entire device uses only one seal 70.

In another embodiment, when a ceramic type filter element 28, shown in FIG. 4, is used, additional seals, such as at 114, floating seal supports 116 and flexible sleeve 118, with additional locking means 78', similar to 78, can be used, as well as fail-safe/regenerator extension 120. These seals, supports and locking means are somewhat similar to those of Lippert et al. U.S. Pat. No. 5,876,471.

Both embodiments shown in FIGS. 3 and 4 isolate a compression-fitted, compliant, primary gasket seal 70, minimizing the formation of leak paths which permit fines to be released from the process gas stream into the clean gas stream, thus optimizing the filter and/or filter holder mount configuration. Neither concept requires direct welding to the filter housing to mitigate the potential formation of particulate leak paths, thus permitting ease of filter element or filter element assembly change-out, should failure of an element, blinding of an element, or the like, occur. This primary gasket seal is preferably a lapped or rolled, non-mat-filled, compliant ceramic braided or woven gasket, such as that of previously referenced U.S. Ser. No. 09/263,436, now U.S. Pat. No. 6,123,746. Both the housing 62 and the fail-safe/regenerator device 68 can be fabricated from a corrosion-resistant alloy, such as stainless steel or the like, and has a density of from about 95% to 100% of theoretical density (0% to 5% porous).

As shown in FIG. 5, both the metal housing 62 and the fail-safe/regenerator 68 have an outward-extending steps (shoulders) 121 and 121'. Said step is part of the joint, which is essential for sealing the sole essential sealing means, gasket 70. The gasket 70 is compressed via tightening bolts 110 within locking means 78 which connect the filter housing 62, fail-safe/regenerator 68, and flanged mount fixtures 99 and 99'. The use of the integral flanges 99 and 99', eliminates the use of the prior art cast nut locking means and associated additional gaskets. Metal spacer nuts 122, shown in FIGS. 3 and 4, are optionally used to provide the proper distance between the joints 98 and 98' to adequately seat and compress the single, compliant, primary gasket 70, sealing the filter assembly.

FIG. 4 illustrates fail-safe/regenerator device 68 and double-flanged locking fixture 78 and 78' for use with ceramic monolithic, filament wound or composite structure elements. Similar to that of the metal, intermetallic, superalloy, metal-composite filter assembly, a single compliant gasket 70 is compressed between steps 121 and 121' within the joints 98 and 98' of metal housing 62 and the fail-safe/regenerator 68. Via said construction, gas flow from the dirty process gas stream is isolated from the clean gas stream through the use of the compression-fit, compliant gasket seal 70. The preferred gasket 70 is that of a lapped or rolled, non-mat-filled, compliant construction.

Referring again to FIG. 4, in order to effectively hold and seal monolithic ceramic, filament wound and/or continuous fiber reinforced ceramic composite (CFCC) filter elements, shown in FIG. 4, within the filter assembly 60, an integral metal ring 130 of length 132 with a collared step of length 134 is included along the interior bottom, of the fail-safe/regenerator 68. The dimensions of 132 and 134 will vary and reflect the flange wall thickness of the various thick-walled and thin-walled ceramic filter elements, and the extension of the collared ring along the inner diameter surface of the filter elements. A gap between the metal ring 130 and perforated plate, screen, mesh assembly set 80' provides an area for maximum release of pulse cleaning gas, which is delivered through the fail-safe/regenerator device into the porous filter body 28.

Additional seals or gaskets, as at 136, can also be used to serve as compliant seals above the candle filter, preventing passage of particulates from the dirty process gas stream into the clean gas process stream. A thin, woven or unwoven ceramic sleeve 118 can be included along the generally inclined outer surface of the hemispherical flange 28', and along the outer diameter surface 29 of the filter element 28. Compliant gasket 114 is used as a cushion to separate the base of the hemispherical candle filter flange 28' from contact with the metal floating seal support 116. During mounting and fixturing, both compliant gaskets 112 and 114 are compressed when bolts 110' are used to tighten metal seal support 116, spacer nuts 122' and extension 120.

The concept described above minimizes the formation of gas leak paths, which potentially permit fines to be released from the process gas stream into the clean gas stream, via compression fitting of two primary compliant gasket seals 70 and 112, thus optimizing the filter holder mount configuration. Should failure of an element occur, said concept permits ease of disassembly, change-out of the filter element without removal of the fail-safe/regenerator device, and reassembly of the filter element within existing filter systems.

The disclosed filter element assembly, shown in FIG. 3, eliminates the use of multiple separate components via construction of an integral fail-safe/regenerator, mount fixture, porous metal, superalloy, intermetallic and/or metal-ceramic composite filter media-containing unit. With minimal parts for assembly, a reduction in field installation time and associated cost is realized. Here, a single, compression-fit, compliant gasket is used to form the primary gasket seal between the filter element assembly (that is, fail-safe/regenerator device, mount fixture and porous filter media) and the filter housing. Since no other gaskets are required, an obvious cost savings is realized. Since leak paths are eliminated, performance reliability is improved.

The use of single, compression-fit, compliant, lapped or rolled, primary gasket seal 70 is a significant improvement over the thin paper gaskets previously used as primary seals. The paper gaskets could be degraded and/or removed during process operation, permitting passage of fines from the process gas stream into the clean gas stream. The single, compliant, lapped or rolled, primary gasket is known to remain in place during process operation, effectively preventing passage of fines into the clean gas stream. Pre-gasketing the filter element assembly improves ease of installation directly into an existing filter housing. The labor-intensive effort associated with proper alignment of separate components (that is, fail-safe/regenerator device, multiple gaskets, filter flange and bottom holder nut) is no longer an issue, due to the use of the gasketed integral filter element assembly.

Expensive machining of the dense metal filter hemispherical flange and bottom cast nut is replaced, and associated costs are reduced, by the use of a single machined, straight-pipe, dense metal housing 68. With the inclusion of a simple flanged mount fixture extension 120, this single non-welded assembly provides ease of removal and/or replacement during change-out with alternate filter elements. The design provides ease of use in either retrofit or new applications.

The disclosed filter element assembly, shown in FIG. 4, eliminates the use of multiple separate components via construction of an integral fail-safe/regenerator device, mount fixture and collared metal ring. Passage of fines from the process gas stream into the clean gas stream is prevented by isolation and separation of the fail-safe/regeneration function of the metal filter housing, from that of the gasketed area where the filter flange is captured and sealed within the filter housing. Both isolated areas rely on the use of a compression-fit, compliant, lapped or rolled, primary gasket, rather than the thin paper gasket used in prior art. The benefits of the compression-fit primary gasket seal over the paper gasket are stated above. Said filter element assembly is also easily retrofitted into existing filter applications for use with monolithic ceramic, filament wound, continuous fiber reinforced ceramic composite (CFCC) filter elements and existing dense metal flange/porous metal filter elements.

Monolithic ceramic, filament wound, continuous fiber reinforced ceramic composite (CFCC) filters are easily removed from the double bolt assembly, permitting retention of the fail-safe/regenerator function during disassembly and/or reassembly of the porous ceramic filter elements. Pre-assembly of the porous ceramic candle filters can be undertaken prior to field installation, whereby the filter element assembly is inserted into the filter housing, and bolts 110 are tightened. Pre-assembly reduces in-field labor time and associated costs. The common elements of the embodiments of FIGS. 3 and 4 are shown in FIG. 5.

The present invention may be embodied in other forms without departing from the spirit or essential attributes thereof, and accordingly, reference should be made to both the appended claims and to the foregoing specification as indicating the scope of the invention.

We claim the Invention:

1. A filter assembly for holding a filter element within a hot gas cleanup system pressure vessel, said filter assembly comprising:
   (a) a tubular filter housing, said filter housing having a parallel top inner wall and bottom inner wall, where the top wall has a smaller inner diameter and where a joint is formed where the walls join, where the bottom wall ends in an integral outward-extending flange with holes therethrough, said walls defining an interior chamber;
   (b) a one piece, all metal, tubular fail-safe/regenerator device, having a parallel top wall and bottom outer wall, where the top wall has a smaller outer diameter and where a joint is formed where the walls join, said walls and joint mating with the inner walls and the joint of the filter housing, and where the bottom wall contains an integral outward-extending flange with holes therethrough which mate with the holes in the filter housing flange;
   (c) one essential sealing means consisting of one compliant gasket separate and apart from the filter housing and fail-safe/regenerator device, said compliant gasket positioned between mating joints of the filter housing and fail-safe/regenerator device, said gasket effective to provide a seal between the filter housing and the fail-safe/regenerator device; and
   (d) a porous filter element body attached at the bottom of the metal fail-safe/regenerator device.

2. The filter assembly of claim 1, where the filter element body is metal.

3. The filter assembly of claim 1, where the filter element body comprises a ceramic.

4. The filter assembly of claim 1, where the one essential compliant gasket is a lapped or rolled, non-mat-filled ceramic gasket.

5. The filter assembly of claim 2, where the metal filter element body is welded to the metal fail-safe/regenerator device.

6. The filter assembly of claim 3, where additional seals are also used between the filter element body and the rest of the assembly.

7. A filter assembly for holding a filter element within a hot gas cleanup system pressure vessel, the filter element including a porous body having two opposing ends, one defining an attachable open end and the other defining a closed end; the filter element body having a uniform inside diameter, said filter assembly for holding a filter element comprising:
   (a) a tubular filter housing, said filter housing having a top end, a bottom end, and a certain axial length and having peripheral inner sidewalls composed of a uniform inner diameter top surface and a larger uniform inner diameter bottom surface defining a first top portion and a second bottom portion, with an inner joint formed where the two portions converge, and where the bottom end has a flat surface perpendicular to the larger uniform inner diameter surface of the bottom portion, said bottom flat surface having at least one hole therethrough, perpendicular to said bottom flat surface, said sidewalls defining an interior chamber;
   (b) a one piece, all metal, tubular fail-safe/regenerator device, having a top portion and a second bottom portion, disposed within the interior chamber of the filter housing, where the top portion has a parallel top outside wall and the bottom portion has a parallel bottom outside wall with an outside diameter larger than the top outside wall, where a joint is formed where the two portions converge, where the outside surfaces of the fail-safe/regenerator device mate with the inside surfaces of the filter housing, the outer surfaces of the fail-safe/regenerator device having a joint opposite the inner joint of the filter housing, and where the bottom end has a flat outside surface mating to the bottom end flat surface of the filter housing, said bottom flat outside surface having at least one hole therethrough opposite at least one the hole through the bottom flat surface of the filter housing, the device also having heat transfer media disposed between a screening means at the top of the device within the filter housing and a screening means at the bottom of the device for particle capture;
   (c) one essential sealing means consisting of one compliant gasket separate and apart from the filter housing and fail-safe/regenerator device, said compliant gasket positioned between the joints of the filter housing and the fail-safe/regenerator device, said gasket effective to provide a complete seal between the filter housing and the fail-safe/regenerator device;

(d) a porous filter element body attached to the bottom of the metal fail-safe/regenerator device outside of the filter housing; and (e) means to attach the filter housing and fail-safe/regenerator device through the opposing holes in each bottom flat surface.

8. The filter assembly of claim 7, where the filter element body is metal.

9. The filter assembly of claim 7, where the filter element body comprises a ceramic.

10. The filter assembly of claim 7, where the one essential compliant gasket is a lapped or rolled, non-mat-filled ceramic gasket.

11. The filter assembly of claim 8, where the metal filter element body is welded to the metal fail-safe/regenerator device.

12. The filter assembly of claim 9, where additional seals are also used between the filter element body and the rest of the assembly.

* * * * *